INVENTORS
ARTHUR H. COHRS
BY BENNETT I. LARSON

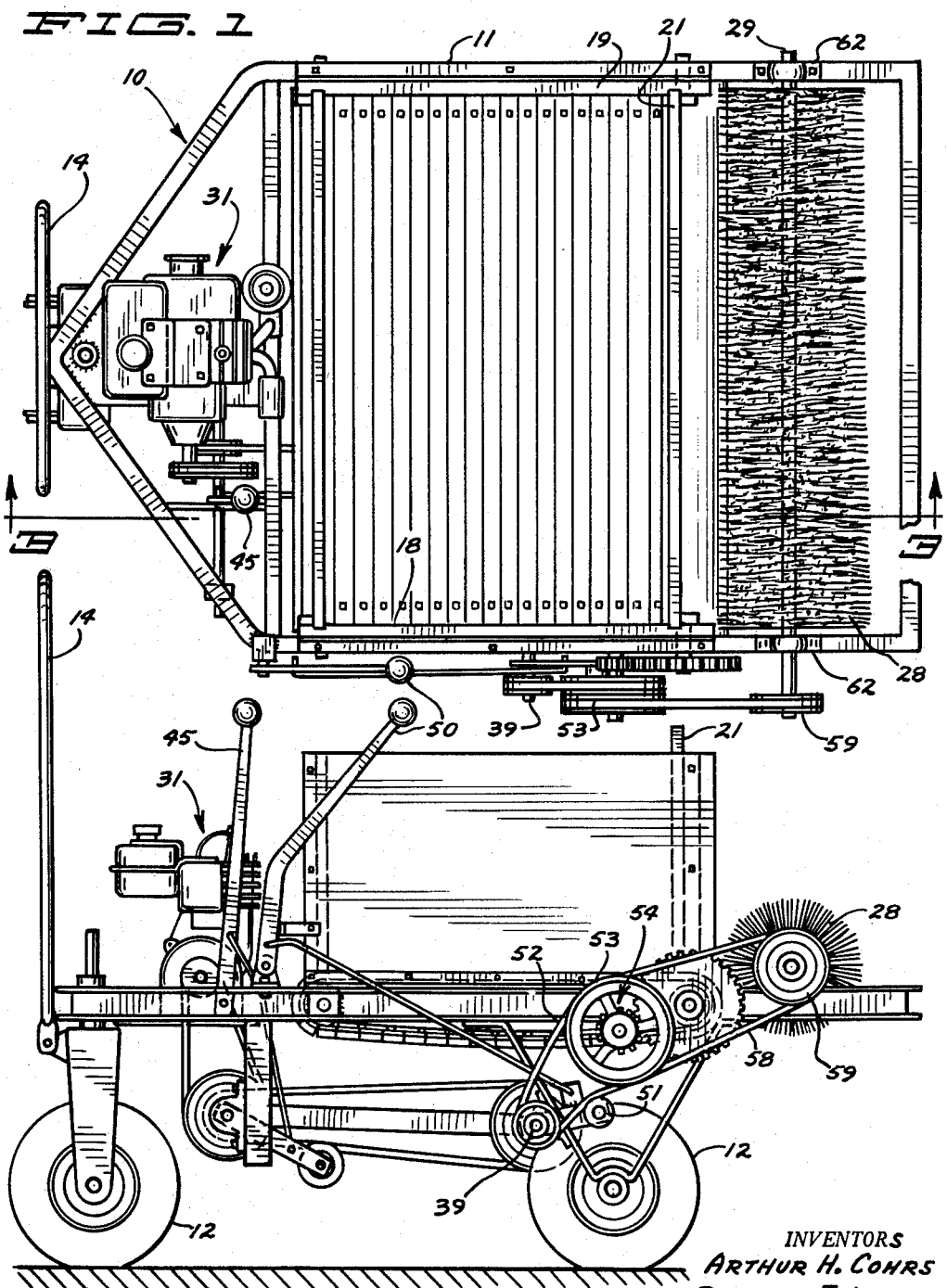

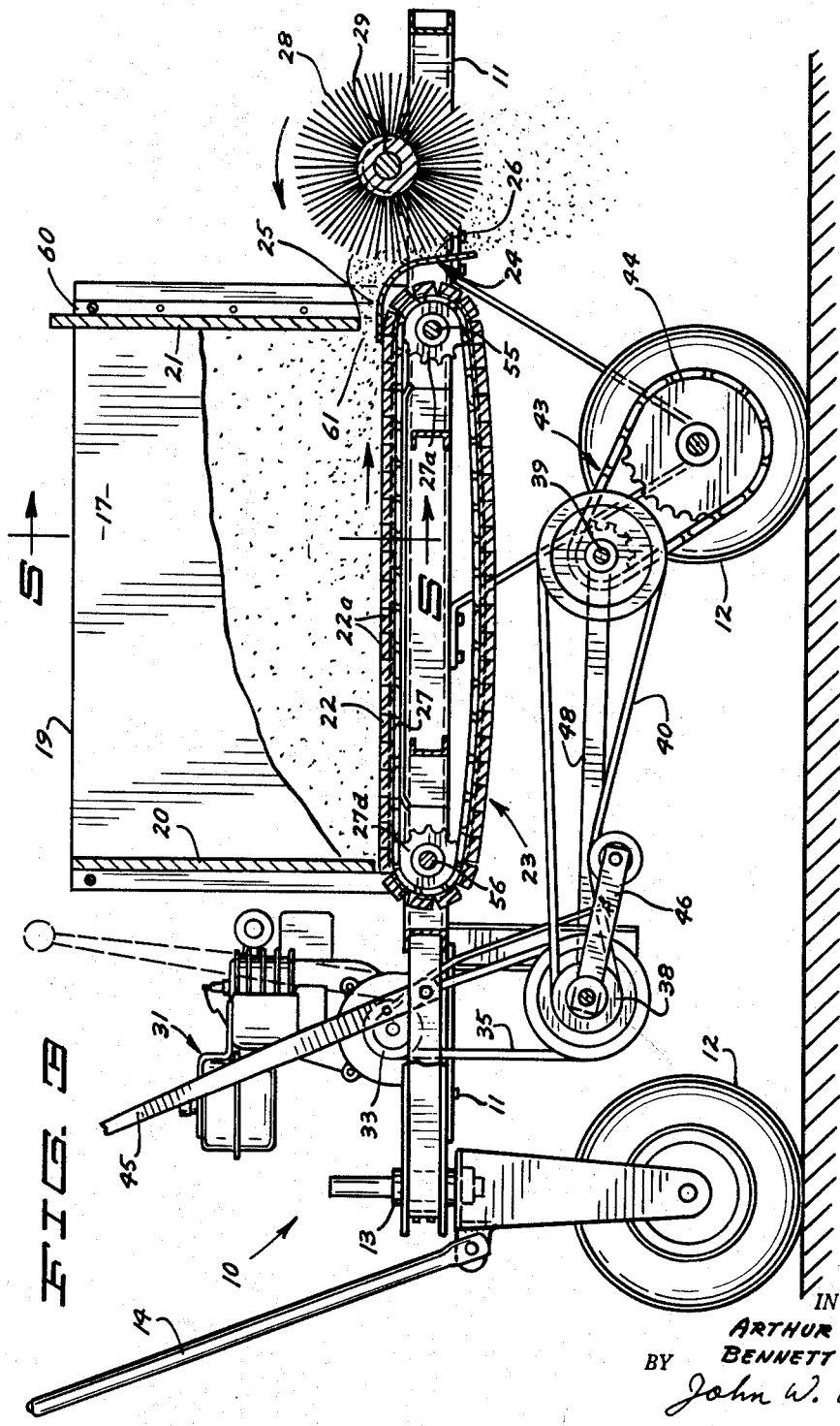

John W. Adams
ATTORNEY

United States Patent Office 3,097,851
Patented July 16, 1963

3,097,851
DIRT METERING AND SPREADING MACHINE
Arthur H. Cohrs, 124 5th Ave. N., and Bennett I. Larson, 37 7th Ave. S., both of Hopkins, Minn.
Filed Nov. 28, 1960, Ser. No. 71,955
4 Claims. (Cl. 275—8)

The present invention relates generally to an improved apparatus for discharging predetermined metered quantities of divided solids onto a given surface area, and more particularly to an improved material discharge apparatus which is arranged to discharge, disperse and spread divided solids such as black dirt or the like at a predetermined density along certain preselected areas, the metering being highly accurate, and the spreading being carefully regulated as to uniformity.

In the preparation and maintenance of lawn areas, particularly golf grass greens and the like, periodic spreading of black dirt is essential to maintaining healthy growth. In order to properly spread the dirt onto the preselected areas, it is essential that the density be within certain defined limits, and that the delivery be substantially uniform across the entire area. In the absence of uniform distribution, localized areas may reasonably become heavily covered with a dense layer or film of earth, and ancillary techniques such as raking and the like may be necessary to redistribute the excess. It will be appreciated that if the original spreading is performed in a uniform fashion, the results are obviously superior.

In accordance with the apparatus of the present invention, a spreading mechanism is provided which uniformly spreads material over a certain area, the spreading being at any desired predetermined density. In this connection, a hopper is provided having an outlet port which may be pre-set for any desired flow rate. A conveyor communicates with the lower surface of the hopper and the dirt is then carried along the conveyor from the hopper and onto a discharge deck. Rotating brush means are arranged in communicating relationship with the discharge deck across the entire transverse dimension of the deck, and the material on the discharge deck by means of the influence of the rotating brush is carried downwardly onto the surface therebelow. There is no tendency for the earth being spread to distribute itself in broadcast fashion, but on the contrary the earth being spread is confined to a relatively small discrete segment or area immediately beneath the spreader.

Therefore it is an object of the present invention to provide an improved spreader apparatus for relatively finely divided solids such as earth or the like, the apparatus being arranged to uniformly distribute and disperse these solids at a predetermined coverage density upon certain preselected areas.

It is still a further object of the present invention to provide an improved earth spreader which is adapted to spread predetermined quantities of earth at a predetermined thickness upon certain areas requiring treatment, the spreader being adapted to deliver consistent quantities so long as the hopper supply is maintained.

Other and further objects of the present invention will become apparent upon a study of the following specification, appended claims and accompanying drawings, in which:

FIG. 1 is a top plan view of the improved spreader apparatus fabricated in accordance with the present invention;

FIG. 2 is a side elevational view of the apparatus shown in FIG. 1;

FIG. 3 is a vertical sectional view on a slightly enlarged scale taken along the line and in the direction of arrows 3—3 of FIG. 1;

Figure 4:
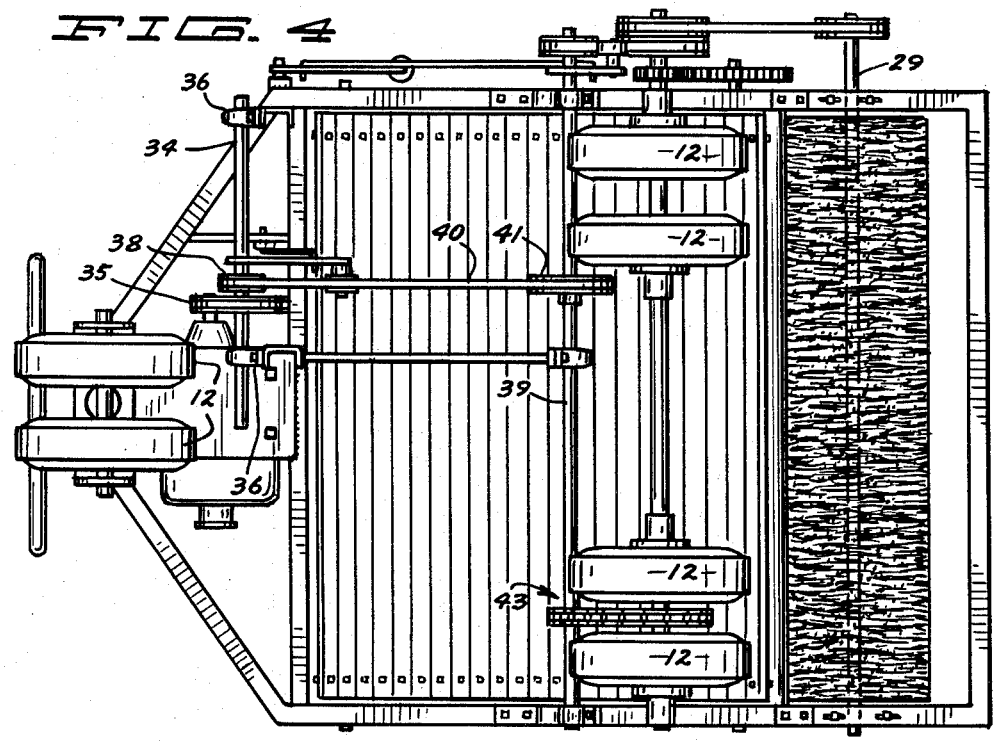
FIG. 4 is a bottom view of the apparatus shown in FIG. 1.
Figure 5:
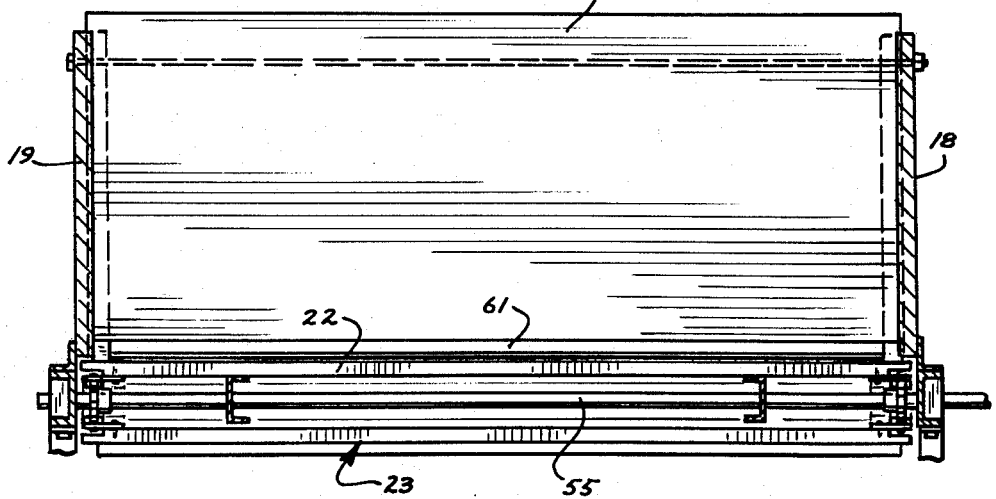
FIG. 5 is a vertical sectional view taken along the line and in the direction of arrows 5—5 of FIG. 3.

In accordance with the preferred embodiment of the present invention, the spreader apparatus generally designated 10 includes a frame assembly 11, and appropriate wheels 12—12, the apparatus being steered by means of the pivotal connection 13 at the front thereof. Control handle 14 is provided at the front of the spreader and is adapted for steering control. A hopper 17 is provided, the hopper being supported along the top of the frame 11 and including side walls 18 and 19, a stationary front wall 20 and a vertically adjustable rear wall 21, the rear wall being movable vertically upwardly to form an orifice 61. The bottom surface of the hopper comprises the top run 22 of a conveyor system generally designated 23. Directly in line with the top run 22 and substantially coplanar therewith, there is provided a discharge deck 24, the deck 24 having a horizontally disposed retention area as at 25 and a vertically disposed rear portion 26. Rotating cylindrical brush 28 is arranged in working relationship to the deck 24, the brush 28 being adapted for rotation along a central axis 29, and rotating in the direction indicated by the adjacent arrow. The surface of the rotating brush 28 in combination or co-operation with the vertically disposed portion 26 of the delivery deck forms a delivery chute or the like for discharging, dispersing and otherwise delivering earth or other finely divided solids downwardly from the horizontal retention area 25. The axial length of the brush is substantially equal to the breadth of discharge deck 24.

A source of power in the form of an internal combustion engine 31 is provided at the front of the hopper, the engine being mounted or secured onto the frame 11 and being positioned immediately adjacent to the hopper 17. The engine 31 is adapted to deliver propulsion energy to the spreader assembly 10 and further supplies energy to axially rotate the brush 28. One additional feature is provided in the engine 31, this being the availability of vibrational energy to the hopper 17. This vibration when made available to the hopper effectively prevents bridging of the earth supply in the hopper so as to cause cessation of delivery of earth or the like through orifice 61 and to the discharge deck 24. The engine 31 delivers power to the shaft and pulley assembly 33, this power being transmitted to the main power shaft 34 by means of belt member 35. Suitable bushings, bearings or the like are provided for the shaft 34 at 36. Power take-off pulley 38 is provided to the system and is mounted for rotation with shaft 34 and is arranged to deliver power to the secondary shaft 39 by means of the belt 40 and the secondary shaft pulley 41. The secondary shaft 39 is provided with a chain and sprocket drive as at 43 for delivering propulsion energy to the apparatus. Accordingly, propulsion energy may be directed to the drive wheels by means of the main drive sprocket 44 as required, the time of delivery being controlled by means of the actuating lever 45 together with the idler pulley 46. The lever 45 operates on an over-center action principle relative to the idler pulley assembly 46. Thus, when the lever 45 is pivoted forwardly, the slack is immediately taken up on the belt 40 and power is supplied to the shaft 39. Compressional rod 48 maintains the proper spacing between the shafts 34 and 39 and accordingly controls tension on the belt 40. Thus, upon actuation of the shaft 39, power is applied directly to one set of rear wheels by means of the chain and sprocket drive generally designated 43. A second over-center lever system 50 is provided, this lever actuating a second idler pulley assembly 51, the idler pulley assembly 51 being pivotally mounted on the shaft 39. Upon take-up of the idler 51, sufficient tension is created in the belt 52 to energize the idler wheel 53 and its associated driven components. A gear train generally designated 54 is adapted to actuate the conveyor assembly 23, and to deliver the rotational energy through shaft 55. Shaft 56 is adapted for free rotation, while belt 58 is adapted to rotate the brush 28, this series of actions being accomplished through rotation of pulley 59 and its accompanying shaft or axis 29.

Referring now specifically to the hopper 17, it is observed that the rear vertical panel 21 is adjustable vertically within the confines of appropriate support channels such as the brackets 60. Suitable means, not shown, such as a ratchet, matching ports and rod or the like may be provided in the channel as well as in the wall 21, thus providing the appropriate desired orifice or opening 61 at the bottom of the hopper. For a given type of ingredient, suitable calibration may be made in order to ascertain the density of delivery of material from the spreader.

Referring now to the conveyor 23, it will be seen that the conveyor has a pair of flights or runs, the important or pertinent flight being the top 22. The conveyor 24, which forms a bottom closure for the hopper, comprises a plurality of individual relatively narrow rigid slat members such as the slats 22a—22a, these individual slats being, of course, essentially identical. Each of the individual slats is secured to the mounting chain 27, the chain being adapted to be carried and propelled by the sprockets 27a—27a. In operation, the conveyor moves in the direction of the indicating arrow depicted adjacent thereto.

Referring now specifically to the brush 28, it will be observed that the brush is adapted to rotate in a certain direction such that in the channel formed between the surface of the brush and the vertical portion 26 of the discharge plate 24 the adjacent peripheral brush surface moves downwardly. In order to compensate for any wear along the periphery of the brush 28, but more specifically in order to assist moving relatively greater or relatively lesser amounts of solids from the discharge plate 24, movable journal bearings 62—62 are provided for the shaft 29, these journal bearings being maintained in mounts adapted for horizontal and vertical adjustment relative to the frame 11. For example, these adjustments may be, in the horizontal case, in the form of slots or the like, and in the vertical sense may be in the form of shims. Therefore, if it is desired to discharge a greater density of material, the surface of the brush should be moved in a direction which places the periphery thereof substantially closer to the upper surface of the discharge plate.

In order to prevent bridging of the material retained in the hopper upon movement thereof in an outward direction through the orifice 61, it is preferred that a source of mechanical vibration be available to the hopper 17. It has been found that the ordinary internal combustion engine provides a suitable amount of vibrational energy to the system and bridging problems are effectively eliminated when the motor is mounted directly on the frame 11. If battery power or other systems are utilized which are not normally inherently vibrational, a suitable eccentric cam or the like should be employed in order that bridging problems in the hopper may be effectively eliminated.

In operation, the hopper 17 is initially filled with a suitable supply or quantity of earth or other finely divided solid material which is to be spread. The lever 45 is then pulled forwardly from the position shown in FIG. 2 to the position shown in FIG. 3. The power from the motor 31 is then available to the rear driver wheels and the assembly may be self-propelled to the point of use. In order to initiate spreading, the gate 21 is elevated to a desired point, at which the orifice 61 is formed to define a certain specified opening of predetermined area. The lever 50 is then taken from the released position shown in FIG. 2 to the belt tensioning position shown in FIG. 3. This starts the conveyor 23 and brush 28, and the material from the hopper is accordingly fed through the opening 61 and is effectively removed, spread and dispersed from the discharge deck 24 onto the surface therebelow by means of the control brush 28. If greater quantities are desired, the opening 61 is made larger, and the brush 28 is moved forwardly into closer physical contact with the discharge deck 24. In this event, uniform distribution is maintained during operation at any of a wide range of spreading densities.

It will, of course, be understood that various changes may be made in the form, details, arrangements and proportion of parts without departing from the scope of our invention, which generally stated consists in the matter set forth in the appended claims.

What is claimed is:

1. Apparatus for discharging predetermined metered quantities of black dirt onto a golf green or the like, said apparatus comprising a hopper, an endless conveyor assembly having an upper run forming the bottom of said hopper, a downwardly curved discharged deck disposed at the rear end of said conveyor and overlying the same adjacent the top thereof, said hopper having a rear portion with the lower end thereof terminating in spaced relation above the discharge deck to define a discharge opening through which the dirt is moved by said conveyor, a rotary generally cylindrical brush disposed rearwardly of the downwardly curved portion of the deck with the axis thereof lying substantially in the plane of the upper run of the conveyor and being driven at a predetermined rate with a peripheral portion thereof disposed in close association to the depending portion of said deck travelling downwardly to positively meter and spread the dirt delivered by said conveyor through said opening.

2. The structure set forth in claim 1 and said apparatus being self-propelled with a gasoline engine mounted thereon to produce vibration thereof and to prevent bridging of the dirt within the hopper.

3. The structure set forth in claim 1 and the spacing between the bottom of the rear hopper portion and the discharge deck being adjustable.

4. The structure set forth in claim 1 and the spacing between the axis of the brush and the depending portion of the discharge deck being adjustable.

References Cited in the file of this patent

FOREIGN PATENTS

| 18,249 | France | Dec. 20, 1913 |
|---|---|---|
| | (Addition to No. 454,257) | |
| 427,207 | France | May 22, 1911 |
| 440,467 | France | May 4, 1912 |
| 575,992 | France | May 2, 1924 |
| 607,478 | France | Mar. 27, 1926 |
| 647,467 | France | July 30, 1928 |
| 42,092 | Germany | Jan. 17, 1888 |
| 83,340 | Germany | Feb. 7, 1894 |
| 148,142 | Sweden | Dec. 21, 1954 |